US 9,247,260 B1
Jan. 26, 2016

(54) HYBRID BITMAP-MODE ENCODING

(75) Inventors: Erik R. Swenson, San Jose, CA (US); Nitin Bhandari, Fremont, CA (US)

(73) Assignee: Opera Software Ireland Limited, Dublin (IE)

( * ) Notice: Subject to any disclaimer, the term of this patent is extended or adjusted under 35 U.S.C. 154(b) by 1612 days.

(21) Appl. No.: 11/929,718

(22) Filed: Oct. 30, 2007

Related U.S. Application Data

(60) Provisional application No. 60/863,888, filed on Nov. 1, 2006.

(51) Int. Cl.
 *H04N 7/12* (2006.01)
 *H04N 19/423* (2014.01)
 *H04N 19/44* (2014.01)

(52) U.S. Cl.
 CPC .............. *H04N 19/423* (2014.11); *H04N 19/44* (2014.11)

(58) Field of Classification Search
 None
 See application file for complete search history.

(56) References Cited

U.S. PATENT DOCUMENTS

| | | | | |
|---|---|---|---|---|
| 5,708,511 A * | 1/1998 | Gandhi et al. | ................ | 382/239 |
| 5,727,159 A | 3/1998 | Kikinis | | |
| 5,790,269 A * | 8/1998 | Masaki et al. | ................ | 358/447 |
| 5,821,915 A * | 10/1998 | Graham et al. | ................ | 345/615 |
| 6,008,847 A | 12/1999 | Bauchspies | | |
| 6,038,257 A | 3/2000 | Brusewitz et al. | | |
| 6,266,817 B1 | 7/2001 | Chaddha | | |
| 6,275,534 B1 | 8/2001 | Shiojiri | | |
| 6,282,240 B1 | 8/2001 | Fukunaga et al. | | |
| 6,285,791 B1 | 9/2001 | Bjorklund | | |
| 6,292,834 B1 | 9/2001 | Ravi et al. | | |
| 6,366,298 B1 | 4/2002 | Haitsuka et al. | | |
| 6,397,230 B1 * | 5/2002 | Carmel et al. | ................ | 715/210 |
| 6,496,203 B1 | 12/2002 | Beaumont et al. | | |

(Continued)

FOREIGN PATENT DOCUMENTS

| | | |
|---|---|---|
| JP | 2003-134362 A | 5/2003 |
| JP | 2003-259310 A2 | 9/2003 |

(Continued)

OTHER PUBLICATIONS

Hsieh, M. et al., "Stateful Session Handoff for Mobile WWW," Information Sciences 2005 [online] [Retrieved on Apr. 10, 2008] Retrieved from the Internet<URL:http://64.233.179.104/scholar?num=30&hl=en&lr=&q=cache: hiW5F6of2CUJ:140.115.51.197/web/PaperManage/Paper/Stateful%2520session%2520hand-off%2520for%2520mobile%2520WWW.pdf>.

(Continued)

*Primary Examiner* — Gregory Sefcheck
*Assistant Examiner* — Jael Ulysse
(74) *Attorney, Agent, or Firm* — Fenwick & West LLP

(57) ABSTRACT

A hybrid bitmap-mode video coding system encodes and decodes a plurality of video frames with optimized coding performance. The coding system filters a video frame to determine an appropriate encoding mode. In response to the video frame to be encoded in bitmap-mode, the coding system generates a bitmap and DCT-type data of the video frame. The bitmap data of the video frame are encoded losslessly to keep the high quality of the video frame. The DCT-type data of the video frame are encoded with compression. The bitmap-mode encoding enables the coding system to flexibly encode part of a video frame data lossless and encode the rest of the frame data lossy. As such, the lossless encoding of the frame provides high quality of important data of the frame, and at the same time maintains high compression ratio on less important data of the frame.

21 Claims, 5 Drawing Sheets

(56) References Cited

U.S. PATENT DOCUMENTS

| | | |
|---|---|---|
| 6,529,552 B1 | 3/2003 | Tsai et al. |
| 6,563,517 B1* | 5/2003 | Bhagwat et al. ............... 715/735 |
| 6,578,201 B1 | 6/2003 | LaRocca et al. |
| 6,584,493 B1 | 6/2003 | Butler |
| 6,704,024 B2 | 3/2004 | Robotham et al. |
| 6,909,753 B2 | 6/2005 | Meehan et al. |
| 6,990,534 B2 | 1/2006 | Mikhailov et al. |
| 7,016,963 B1 | 3/2006 | Judd et al. |
| 7,043,745 B2 | 5/2006 | Nygren et al. |
| 7,054,365 B2 | 5/2006 | Kim et al. |
| 7,088,398 B1 | 8/2006 | Wolf et al. |
| 7,116,843 B1 | 10/2006 | Wensley et al. |
| 7,257,158 B1 | 8/2007 | Figueredo et al. |
| 7,483,575 B2* | 1/2009 | Fukuhara et al. ............. 382/232 |
| 7,617,110 B2* | 11/2009 | Kim et al. ..................... 704/501 |
| 7,821,953 B2 | 10/2010 | Yarlagadda et al. |
| 8,018,850 B2 | 9/2011 | Van Beek et al. |
| 2002/0015532 A1 | 2/2002 | Kostrzewski et al. |
| 2002/0041629 A1 | 4/2002 | Hannuksela |
| 2002/0059368 A1 | 5/2002 | Reynolds |
| 2002/0067353 A1 | 6/2002 | Kenyon et al. |
| 2002/0122491 A1 | 9/2002 | Karczewicz et al. |
| 2002/0131083 A1* | 9/2002 | Hamzy et al. ................ 358/1.15 |
| 2002/0146074 A1 | 10/2002 | Ariel et al. |
| 2002/0196853 A1* | 12/2002 | Liang .................... H04N 19/61 375/240.16 |
| 2003/0020722 A1* | 1/2003 | Miura ........................... 345/560 |
| 2003/0039312 A1* | 2/2003 | Horowitz et al. ........ 375/240.24 |
| 2003/0046708 A1 | 3/2003 | Jutzi |
| 2003/0079222 A1 | 4/2003 | Boykin et al. |
| 2003/0122954 A1 | 7/2003 | Kassatly |
| 2003/0132957 A1 | 7/2003 | Ullmann et al. |
| 2003/0138050 A1 | 7/2003 | Yamada et al. |
| 2003/0177269 A1 | 9/2003 | Robinson et al. |
| 2003/0198184 A1 | 10/2003 | Huang et al. |
| 2003/0202697 A1* | 10/2003 | Simard ................. H04N 1/403 382/195 |
| 2003/0227977 A1 | 12/2003 | Henocq |
| 2004/0022322 A1 | 2/2004 | Dye |
| 2004/0067041 A1* | 4/2004 | Seo et al. ........................ 386/46 |
| 2004/0083236 A1 | 4/2004 | Rust |
| 2004/0109005 A1* | 6/2004 | Witt et al. ..................... 345/611 |
| 2004/0184523 A1 | 9/2004 | Dawson et al. |
| 2004/0217980 A1 | 11/2004 | Radburn et al. |
| 2005/0052294 A1 | 3/2005 | Liang et al. |
| 2005/0081158 A1 | 4/2005 | Hwang |
| 2005/0089092 A1 | 4/2005 | Hashimoto et al. |
| 2005/0100233 A1 | 5/2005 | Kajiki et al. |
| 2005/0105619 A1 | 5/2005 | Lee et al. |
| 2005/0132286 A1 | 6/2005 | Rohrabaugh et al. |
| 2005/0147247 A1 | 7/2005 | Westberg et al. |
| 2005/0195899 A1 | 9/2005 | Han |
| 2005/0232359 A1* | 10/2005 | Cha .......................... 375/240.16 |
| 2005/0257167 A1 | 11/2005 | Fraleigh et al. |
| 2005/0267779 A1 | 12/2005 | Lee et al. |
| 2005/0283734 A1 | 12/2005 | Santoro et al. |
| 2006/0018378 A1 | 1/2006 | Piccinelli et al. |
| 2006/0069797 A1 | 3/2006 | Abdo et al. |
| 2006/0078051 A1 | 4/2006 | Liang et al. |
| 2006/0095944 A1 | 5/2006 | Demircin et al. |
| 2006/0098738 A1 | 5/2006 | Cosman et al. |
| 2006/0150224 A1 | 7/2006 | Kamariotis |
| 2006/0168101 A1 | 7/2006 | Mikhailov et al. |
| 2006/0170571 A1* | 8/2006 | Martinian ............... H03M 7/30 341/50 |
| 2006/0174026 A1 | 8/2006 | Robinson et al. |
| 2006/0174614 A1 | 8/2006 | Dong et al. |
| 2006/0184614 A1 | 8/2006 | Baratto et al. |
| 2006/0210196 A1 | 9/2006 | Wensley et al. |
| 2006/0218285 A1 | 9/2006 | Talwar et al. |
| 2006/0233246 A1 | 10/2006 | Park et al. |
| 2006/0256380 A1* | 11/2006 | Klassen et al. ............... 358/1.16 |
| 2006/0277478 A1 | 12/2006 | Seraji et al. |
| 2006/0282855 A1 | 12/2006 | Margulis |
| 2006/0285594 A1 | 12/2006 | Kim et al. |
| 2006/0291561 A1 | 12/2006 | Seong et al. |
| 2007/0005795 A1* | 1/2007 | Gonzalez .......... G06F 17/30017 709/232 |
| 2007/0071100 A1* | 3/2007 | Shi ....................... H04N 7/0137 375/240.16 |
| 2007/0098283 A1* | 5/2007 | Kim ..................... H04N 19/176 382/239 |
| 2007/0116117 A1 | 5/2007 | Tong et al. |
| 2007/0121720 A1 | 5/2007 | Yamane et al. |
| 2007/0250711 A1 | 10/2007 | Storey |
| 2007/0277109 A1 | 11/2007 | Chen et al. |
| 2008/0062322 A1 | 3/2008 | Dey et al. |
| 2008/0065980 A1 | 3/2008 | Hedbor |
| 2008/0071857 A1 | 3/2008 | Lie |
| 2008/0158333 A1 | 7/2008 | Krisbergh et al. |
| 2009/0219992 A1 | 9/2009 | Wang |
| 2009/0245668 A1* | 10/2009 | Fukuhara et al. ............. 382/238 |

FOREIGN PATENT DOCUMENTS

| | | |
|---|---|---|
| JP | 2006-270690 A | 10/2006 |
| WO | WO 2005/081528 A1 | 9/2005 |

OTHER PUBLICATIONS

PCT International Search Report and Written Opinion, PCT/US07/83218, Jun. 12, 2008, 7 pages.
PCT International Search Report and Written Opinion, PCT/US07/83214, Apr. 30, 2008, 7 pages.
PCT International Search Report and Written Opinion, PCT/US07/83203, Apr. 3, 2008, 9 pages.
Hsieh, M-D. et al., "Stateful Session Handoff for Mobile WWW," Revised Form Jan. 27, 2005, Accepted Feb. 26, 2005, Information Sciences, Elsevier, pp. 1241-1265, vol. 176.
Hsieh, M. et al., "Stateful Session Handoff for Mobile WWW," Information Sciences 2005, [online] [Retrieved Apr. 10, 2008] Retrieved from the Internet<URL:http:140.115.51.197/web/PaperManage/Paper/Stateful%20session%20handoff%20for%20mobile%20WWW.pdf>.
"NewFront Browser v3.4," Access Co., Ltd., Nov. 30, 2006 [online] [Retrieved on Jul. 11, 2008] Retrieved from the Internet<URL:http://www.access.company.com/PDF/NetFront/120406_NFv34.pdf>.
PCT International Search Report and Written Opinion, PCT/US08/52129, Jul. 23, 2008, 7 pages.
PCT International Search Report and Written Opinion, PCT/US08/52092, Jul. 14, 2008, 9 pages.
Warabino, T. et al., "Video Transcoding Proxy for 3Gwireless Mobile Internet Access," IEEE Communications Magazine, Oct. 2000, pp. 66-71.
Japanese Office Action, Japanese Application No. 2009-534948, Feb. 18, 2013, 4 pages.
Japanese Office Action, Japanese Application No. P2009-534948, Jul. 9, 2013, 6 pages.

* cited by examiner

HYBRID BITMAP-MODE ENCODING

CROSS-REFERENCE TO RELATED APPLICATIONS

The present application claims priority under 35 U.S.C. §119(e) to U.S. Provisional Patent Application No. 60/863,888, filed on Nov. 1, 2006, entitled "CONTENT ACCESS USING COMPRESSION" which is incorporated by reference in its entirety.

BACKGROUND

1. Field of the Invention

This invention pertains in general to use video compression technology to encode and decode information, and in particular, to provide an enhanced hybrid video coder using bitmap-mode coding.

2. Description of the Related Art

Video compression is useful for transmission of digital video over a variety of bandwidth-limited networks, or for storage constrained applications. For example, the broadcast transmission of digital video at 24-bit per pixel sampled at 720 by 480 spatial resolution and 30 frames per second (fps) temporal resolution would require a bit rate of above 248 Mbps! Taking another example of supporting web browser applications with rich media content in a client-server architecture within a wireless network, bandwidth limitations of the wireless network itself may comprise one of the major limiting factors in fully utilizing the client-server architecture. Client devices, such as mobile phones, may additionally be resource-constrained with respect to the device's capabilities, including processing power, memory and battery life limitations. Compounding this, web browser applications are continually embracing rich media content, such as digital video and audio, which in turn poses further challenges for a client-server architecture. For applications such as digital television broadcasting, satellite television, Internet video streaming, video conferencing and video security over a variety of networks, limited transmission bandwidth or storage capacity stresses the demand for higher video compression ratios.

To improve compression efficiency, currently available coding standards, such as MPEG-1, MPEG-2, MEPG4 and H.264/AVC etc., remove information redundancy spatially within a video frame and temporally between video frames. The goal of video compression systems is to achieve the best fidelity (or the lowest distortion D) given the capacity of a transmission channel, subject to the coding rate constraint R(D). However, this optimization task is complicated by the fact that various coding options show varying efficiency with different scene content and at different bit rates.

One limitation with conventional hybrid video coders such as a H.264 video coder is inefficiency at removing encoding noise especially around sharp edges. Such encoding noise, such as the mosquito artifacts, is easily noticeable to human eyes especially when browsing images that often contains text with a simple background, such as black text on a white background. For browsing images, the text embedded in the images needs to be encoded with high fidelity, but the simple background can afford more compression since not much data are contained in the background. To allow regions of an input picture to be represented without any loss of fidelity, H.264 video coding standard includes a "PCM" macroblock mode, in which the values of input pixels are sent directly from an encoder to a decoder without prediction, transformation or quantization. Additional motivation for this macroblock mode is to impose a minimum upper bound on the number of bits that can be used to represent a macroblock with sufficient accuracy. However, the PCM mode is not efficient to deal with encoding noise because an encoder can only choose to use PCM for high quality, at the expense of higher bit rate, or not use PCM for less high quality with a controlled bit rate for the encoder.

Hence, there is, inter alia, a lack of a system and method that provides an enhanced hybrid encoder within a video processing system.

BRIEF SUMMARY

The needs described above are addressed by a method and system for compressing video frames with optimization. In one embodiment, the system comprises an encoding unit for encoding a video frame in bitmap mode, a decoder for decoding in bitmap mode and a bitmap filtering unit. The encoding unit encodes data for transmission in response to a signal at the filtering unit indicating bitmap-mode encoding. The bitmap filtering unit is configured to determine the bitmap-mode encoding by filtering the video frame. The bitmap filtering unit generates a bitmap of the video frame by extracting the most significant bits of each pixel of the video frame and further generates DCT-type data of the frame by further manipulating the pixels of the frame. The encoding unit is configured to losslessly encode the bitmap data using a bitmap encoder and to lossy encode the DCT-type data of the frame using a DCT encoder, such as a H.264 video encoder. A bitstream generator of the encoding unit combines the encoded bitmap data and DCT-type data into an encoded bitstream for transmission and decoding. The decoder for decoding in bitmap-mode decodes the encoded bitstream generated in bitmap-mode encoding using a bitmap extractor, a bitmap decoder, a DCT decoder, and inverse bitmap filtering unit. The present invention also includes method for encoding and decoding corresponding to the encoding unit and the decoder of the system

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
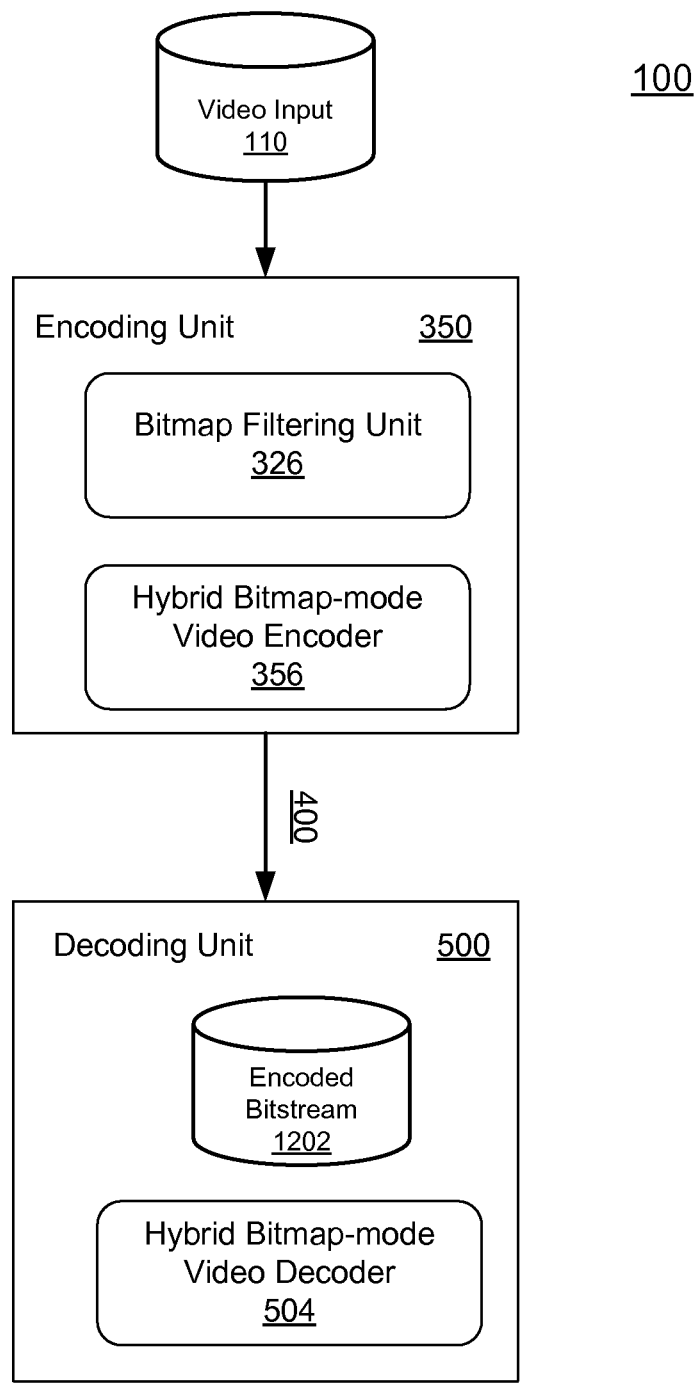
FIG. 1 is a block diagram illustrating a video processing system according to one embodiment.

FIG. 1 is a block diagram illustrating a video processing system 100 according to one embodiment. The system 100 includes a video input 110 or video source to provide a plurality of input video frames, an encoding unit 350, a communications means 400 and a decoding unit 500. The encoding unit 350 comprises a bitmap filtering unit 326 and a hybrid bitmap-mode video encoder 356. The decoding unit 500 comprises an encoded bitstream buffer 1202 and a hybrid bitmap-mode video decoder 504. The encoding unit 350 receives a video frame from the video input 110, filters the input frame using the bitmap filtering unit 326, compresses the filtered input frame data in a selected encoding mode by the hybrid bitmap-mode video encoder 356 and generates an encoded bitstream. The encoded bit stream is transmitted through the communications means 400 and sent to the decoding unit 500. The encoded bitstream 1202 is received by the decoding unit 500 and decoded by the hybrid bitmap-mode video decoder 504 to reconstruct the input video frame.

In one embodiment, the video input 110 comprises a sequence of video frames and each video frame includes of blocks of raw video signals/samples in an uncompressed format. The video input 110 may be received from a variety of video sources, such as a television station, a camcorder, a CD, a DVD, a network, a video database, or a volatile or non-volatile memory. Further, the video input 110 may be received in an analog format and converted to a digital format by an analog-to-digital converter before being processed by the encoding unit 350. In another embodiment, the video input 110 comprises a plurality of pixel-based browsing images of a video source displayed on a display screen or stored in a frame buffer.

The communications means 400 enables communications between the encoding unit 350 and the decoding unit 500. In one embodiment, the communications means 400 uses standard communications technologies and/or protocols. Thus, the communications means 400 may include fixed links using technologies such as Ethernet, integrated services digital network (ISDN), digital subscriber line (DSL), asynchronous transfer mode (ATM), or other fixed links technologies. The communications means 400 may also support mobile access using technologies such as Wideband Code Division Multiple Access (W-CDMA), CDMA200, Global System for Mobile Communications (GSM), General Packet Radio Service (GPRS), or similar technologies. Further, the communications means 400 may include wireless access using technologies, such as Wireless Local Area Network (W-LAN), Worldwide Interoperability for Microwave Access (WiMAX), or other wireless technologies.

Similarly, the networking protocols used on the communications means 400 may include multiprotocol label switching (MPLS), the transmission control protocol/Internet protocol (TCP/IP), the User Datagram Protocol (UDP), the session initiation protocol (SIP), the session description protocol (SDP), the hypertext transport protocol (HTTP), the simple mail transfer protocol (SMTP), the file transfer protocol (FTP), or any other suitable protocol. The data exchanged over the communications means 400 may be represented using technologies and/or formats including the hypertext markup language (HTML), the extensible markup language (XML), or any other suitable format. In addition, all or some of links may be encrypted using conventional encryption technologies, such as the secure sockets layer (SSL), Secure HTTP and/or virtual private networks (VPNs) or Internet Protocol security (IPsec). For example, for encoding sensitive data such as a user's personal bank statement displayed by the user's on-line banking system, the encoding unit 350 may encrypt the video channel to carry the encoded bitstream before sending it over the video channel. In one embodiment, an encryption unit may reside in the encoding unit 350 to encrypt the encoded bitstream. In another embodiment, the communications between the encoding unit 350 and the decoding unit 500 may use custom and/or dedicated data communications technologies instead of, or in addition to, the ones described above.

To enhance the encoding performance by conventional video encoders, the video processing system 100 uses bitmap-mode coding that deploys the optimized usage of conventional PCM mode. In contrast to the conventional PCM mode operation where a macroblock of a video frame is either encoded losslessly using the PCM mode, or lossy encoded without using PCM mode for higher compression ratio, the bitmap-encoding mode enables the encoding unit 350 to flexibly encode part of the video frame data lossless and encode the rest of the frame data lossy. As such, the lossless encoding of the frame provides high quality of important data of the frame, and at the same time maintains high compression ratio on less important data of the frame.

In one embodiment, compression is handled by dedicated hardware with a very low latency encoder. In another embodiment, image of a static web page without embedded or complex text/graphics can be compressed by a software encoder as a video frame. Other embodiments may implement the encoding unit 350 in both hardware and/or software. Other embodiments perform different and/or include additional modules than the ones described here. For example, the encoding unit 350 may comprise a frame buffer for reference frames management.

Figure 2:
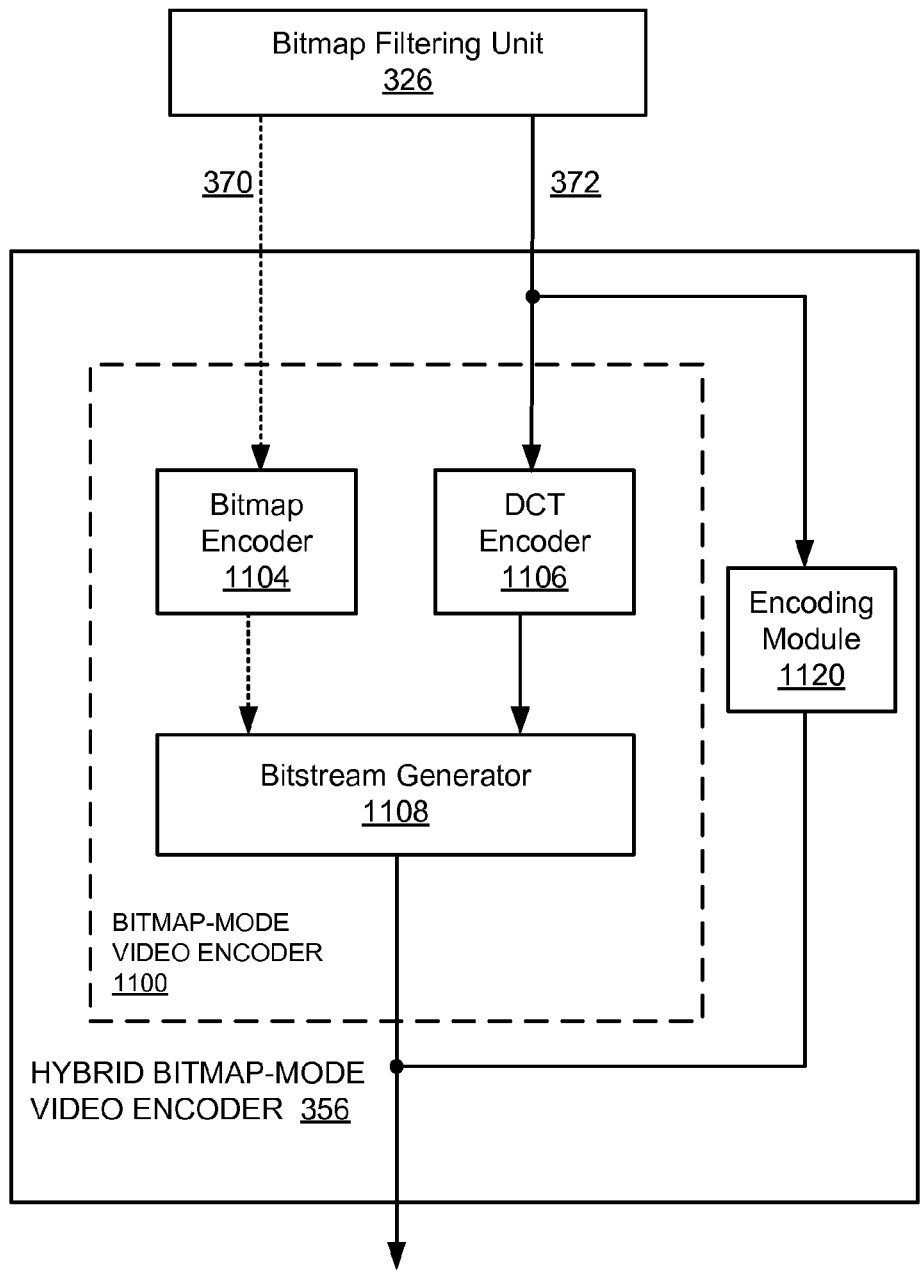
FIG. 2 is a block diagram illustrating modules within a bitmap-mode video encoder according to one embodiment.

Turning now to the individual entities illustrated in FIG. 2, in one embodiment, the bitmap filtering unit 326 determines whether to perform bitmap-mode encoding based on detecting sharp edges in the received frame samples. It is to be understood that edges detection algorithms, such as search-based edge detection methods, known to those skilled in the art may be used for the determination. It is also to be understood that in other embodiments, the bitmap filtering unit 326 may use other algorithms, for example video content-based analysis, to determine whether to perform the bitmap-mode encoding.

In response to a video frame to be encoded in bitmap mode, the bitmap filtering unit 326 filters the video frame in various ways to generate: 1) a bitmap for the video frame; and 2) filtered frame sample data of the video frame for further encoding. For the purpose of illustration of one embodiment, the filtered frame sample data of the video frame will be referred to as DCT-type data hereinafter. After filtering the video frame, the bitmap filtering unit 326 sends an indication of bitmap-mode encoding, the bitmap and the DCT-type data of the video frame to the video encoder 356 for further processing. The bitmap data path from the bitmap filtering unit 326 to the video encoder 356 is represented by the dashed line 370 and the DCT-type data path by the solid line 372 in FIG. 2. In response to the video frame to be encoded in non-bitmap mode, the original video frame from the video input buffer 110 is sent to the video encoder 356 for further processing.

In one embodiment of the bitmap-mode encoding, for each pixel of the video frame, the bitmap filtering unit 326 extracts the most significant bit (MSB) of the pixel and generates the bitmap of the video frame by collecting these MSB bits from each pixel in the same order as the pixels are extracted. In other embodiments, a portion of variable sizes of frame pixels are used for bitmap generation. To generate the DCT-type data of the video frame, the bitmap filtering unit 326, in one embodiment, replaces the MSB of each pixel of the video frame with a zero. In another embodiment, the bitmap filtering unit 326 picks two integer values corresponding to the two dominant colors of the video frame, and replaces one value with another one. In this case, the bitmap data is bi-level run data that is a series of runs between replaced and static pixels. Each time the filter of the bitmap filtering unit 326 toggles between replacing a pixel and not replacing a pixel, the run between such states is encoded. For example, for a video frame of black text with white background, the bitmap filtering unit 326 may pick value 1 for white pixel and value 2 for black pixel, and replace the black pixels by white pixels after extracting the bitmap of the video frame. As such, the DCT-type data after filtering are all white pixels which can be compressed with higher compression ratio. It is also noted that, in other embodiments, more than two colors (i.e., black and white) can be used to generate bitmap data of the video frame.

In another embodiment, the bitmap filtering unit 326 may invert the pixel value for values above 127 after taking its MSB to avoid creating unnecessary energy in the pixel. Taking 8-bit pixels as an example, blindly setting the MSB to zero for a pixel may result a sawtooth like pattern in terms of pixel energy when a pixel value approaching 128 from 127. For an image that has smooth gradients around 128, unnecessary energy is created by the filtering process. By inverting the pixel value as described, the bitmap filtering unit 326 enables the filtered data after bitmap extraction to be compressed with high compression ratio but without creating unnecessary energy. In another embodiment, there can be more one region of bi-level in a video frame. For each region of interest, a decoder just needs to know the foreground color to replace back into the decoded frame. More specifically, an encoder can send a pixel value to use as the foreground color as often as needed. If there is only one value for the whole frame, it only has to send the foreground color pixel once.

In response to receiving the indication of bitmap-mode encoding from the bitmap filtering unit 326, the bitmap and DCT-type data of the video frame, the video encoder 356 encodes the bitmap and DCT-type data of the video frame into a video stream and sends it to its corresponding decoder over the network. FIG. 2 is a block diagram illustrating modules within a bitmap-mode video encoder 1100 embedded in the video encoder 356 according to one embodiment. The bitmap-mode video encoder 1100 includes a bitmap encoder 1104 for bitmap data encoding, a DCT encoder 1006 for DCT-type data encoding and a bitstream generator 1108 to generate the encoded bitstream of the video frame.

In response to encode the video frame in non-bitmap-mode, the video frame is processed by an encoding module 1120 of the video encoder 356. In one embodiment, the encoding module 1120 employees the conventional encoding algorithm, such as H.264 encoding, to encode the video frame. For example, in one embodiment, the encoding unit 350 employs the major components used in the H.264 video compression standard. More specifically, the video encoder 356 uses the DCT-like forward and reverse transforms on prediction residuals. The video encoder 356 also uses the flexible macroblock sizes ranging from 16×16 to 4×4. The various macro and sub-macroblock sizes allow fine-grained tuning of the blocks to the content being encoded. Other H.264 components, such as logarithmic quantizer, intra and inter prediction and context adaptive entropy encoding may also be used to perform the compression. In one embodiment, the encoding unit 350 also includes modules such as conventional rate controller and error recovery module used in conventional video coding standards as part of an optimized encoder control. Those skilled in the art will recognize that H.264 is used only by way of example and that a variety of other encoding and compression schemes may be used. In another embodiment, the video frame is encoded by the DCT encoder 1106. In yet another embodiment, the DCT encoder 1106 and the encoding module 1120 may be combined into one encoding function entity to encode DCT-type data in bitmap-mode encoding and/or original input video frame in non-bitmap-mode encoding.

For a video frame to be encoded in bitmap mode, the bitmap map encoder 1104 receives the bitmap data of the video frame from the bitmap filtering unit 326 (the dashed line) and the DCT encoder 1106 receives the DCT-type data of the video frame from the bitmap filtering unit 326 (the solid line). In one embodiment, the bitmap encoder 1104 encodes the bitmap using run-length encoding algorithm such as unsigned exp-golomb codes to process the data in scanline order. In other embodiments, other encoding algorithms known to those skilled in the art may be used to encode the bitmap. For the DCT-type data of the video frame, the DCT encoder 1106 encodes the DCT-type data as the conventional video encoder such as a H.264 video encoder. More specifically, the DCT encoder 1106 applies DCT-like transformation to the DCT-type data, quantization procedure on the DCT transform coefficients and entropy encoding of the quantization coefficients. In another embodiment, the DCT encoder 1106 and the encoding module 1120 may be combined into one encoding function entity to encode DCT-type data in bitmap-mode encoding and/or original input video frame in non-bitmap-mode encoding.

The bitstream generator 1108 combines the encoded bitmap data from the bitmap encoder 1104 and the encoded DCT-type data from the DCT encoder 1106 to generate the output video stream. In one embodiment, the bitstream generator 1108 extends the conventional H.264 encoded bitstream format to combine the encoded bitmap and DCT-type data. More specifically, a video bitstream after encoding in H.264 comprises a sequence of network access layer (NAL) units. A typical sequence of H.264 NALs may look like the following:

NAL1=SPS (sequence parameter set), NAL2=PPS (picture parameters set), and NAL3=Slice Data (picture data).

The bitstream generator 1108 may extend the above sequence into one like this:

NAL0=bitmap, NAL1=SPS, NAL2=PPS, and NAL3=Slice Data (picture data), where NAL0 is typically not used by a conventional H.264 codec, and "bitmap" is the encoded bitmap data of the video frame and the rest of NALs stores the encoded DCT-type data as a typical H.264 encoder does.

Figure 3:
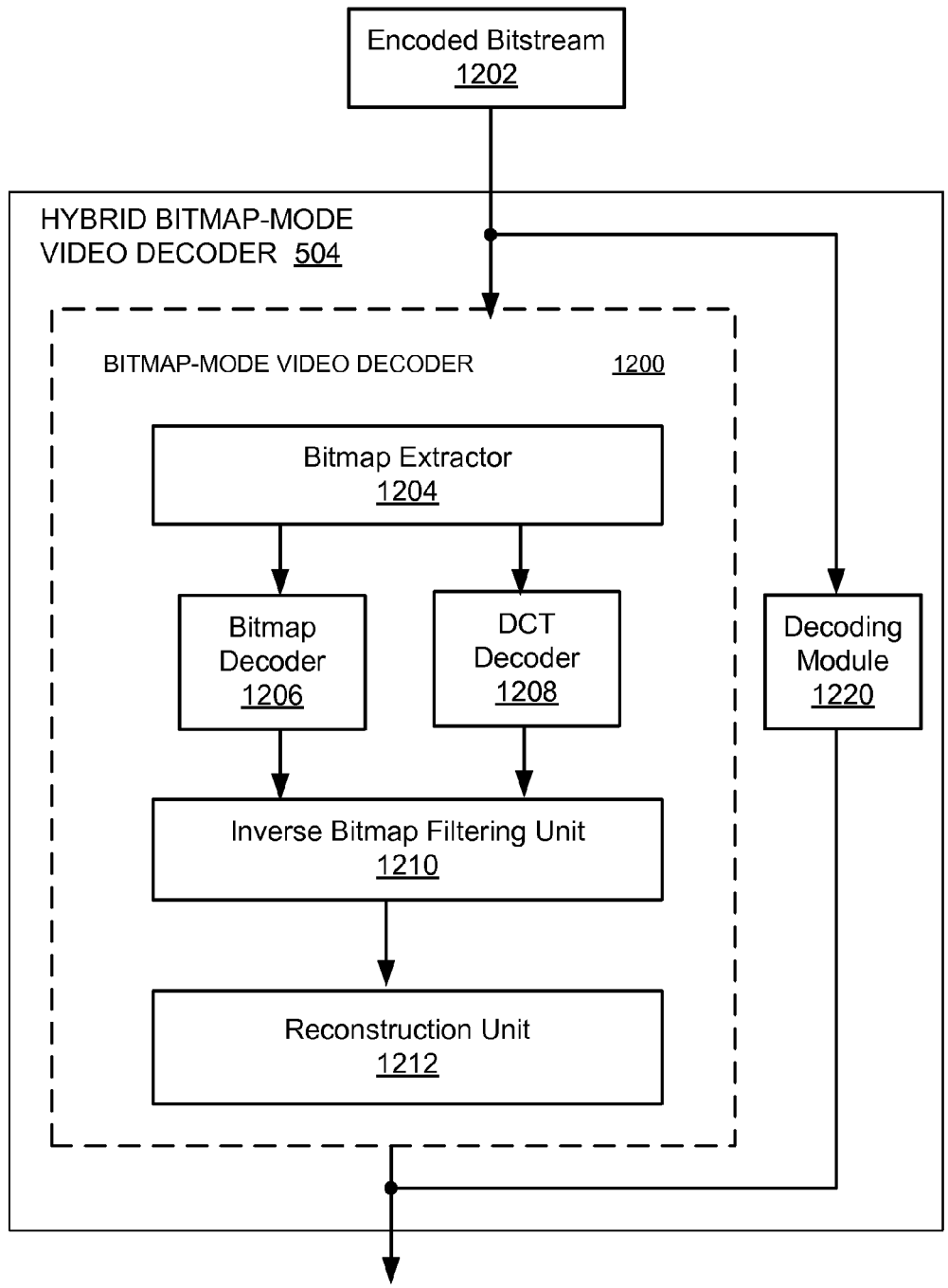
FIG. 3 is a block diagram illustrating modules within a bitmap-mode video decoder according to one embodiment.

FIG. 3 is a block diagram illustrating modules within a bitmap-mode video decoder 1200 embedded in the hybrid bitmap-mode video decoder 504 according to one embodiment. The bitmap-mode video decoder 1200 includes a bitmap extractor 1204 to extract the bitmap embedded in the encoded bitstream received by the decoder 1200, a bitmap decoder 1206 to decode the bitmap to obtain the MSBs or bi-level run data of an encoded video frame, a DCT decoder 1208 to decode the DCT-type data, an inverse bitmap filtering unit 1210 to combine the MSBs with the decoded DCT-type data and a reconstruction unit 1212 to restore the video frame. In response to decode the encoded bitstream in non-bitmap-mode, in one embodiment, the encoded bitstream is processed by a decoding module 1220 of the video decoder 504 using conventional decoding algorithm, such as H.264 decoding, to decode the bitstream. In another embodiment, the encoder bitstream is decoded by the DCT decoder 1208. Alternatively, the DCT decoder 1208 and the decoding module 1220 may be combined into one decoding function entity to decode DCT-type data in bitmap-mode decoding and/or original encoded bitstream in non-bitmap-mode decoding.

Taking the example of the encoded bitstream generated by the video encoder 1100 above, the bitmap-mode video decoder 1200 receives the encoded bitstream 1202 in the following sequence of NALs from the encoder 1100, NAL0=bitmap, NAL1=SPS, NAL2=PPS, and NAL3=Slice Data (picture data).

The bitmap extractor 1204 strips out NAL0 and sends it to the bitmap decoder 1206. The bitmap extract 1204 sends the rest of the NALs, i.e., NAL1, NAL2, and NAL3 to the DCT decoder 1208. In one embodiment, the bitmap decoder 1206 recreates the original bitmap using run-length decoding algorithm. The DCT decoder 1208 decodes the DCT-type data embedded in the NAL1-3 using conventional H.264 decoding procedures, such as entropy decoding, inverse quantization, followed by inverse DCT transform. The inverse bitmap filtering unit 1210 receives the recreated bitmap and DCT-type data of the video frame from the bitmap decoder 1206 and the DCT decoder 1208 and combines the received data in reverse operation of the bitmap filtering unit 326 at the video encoder 356. For example, if the MSB of each pixel is replaced by a zero at the bitmap filtering unit, the inverse bitmap filtering unit 1210 replaces the zero with the recreated MSB. The reconstruction unit 1212 reconstructs the video capture using the data from the inverse bitmap filtering unit. Due to the flexible hybrid lossless and lossy encoding and decoding of the video capture described above, the reconstructed video capture closely resembles the original input video frame.

Figure 4:
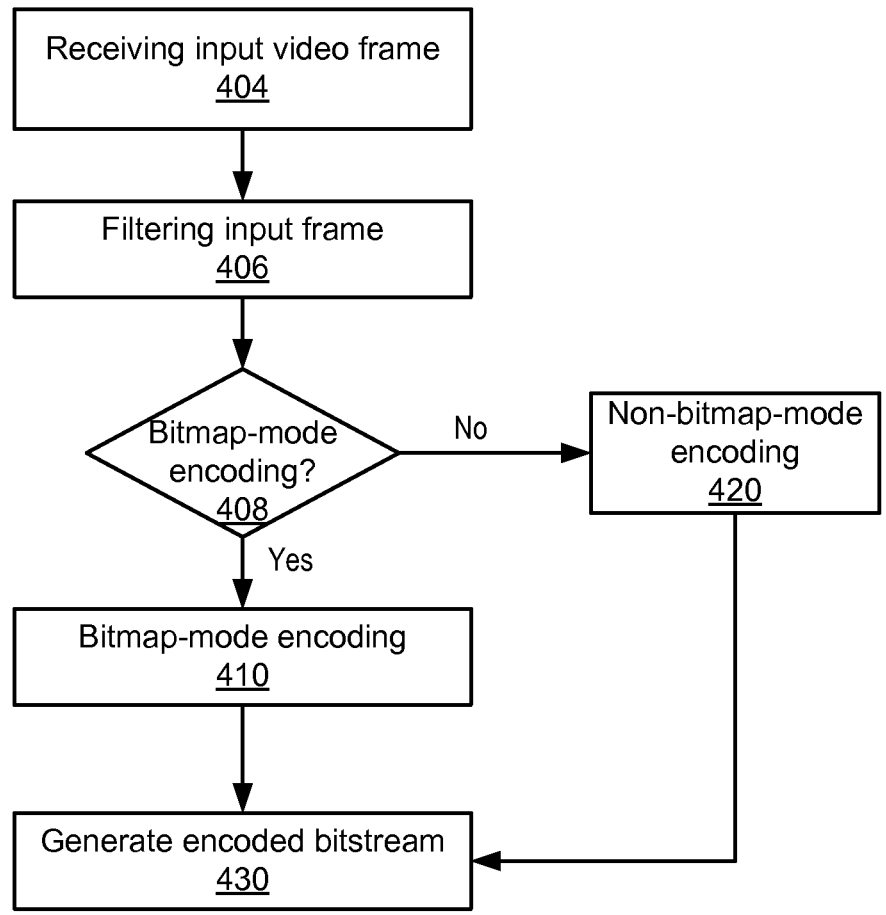
FIG. 4 is a flowchart illustrating a bitmap-mode video encoding process according to one embodiment.

FIG. 4 is a flowchart illustrating a bitmap-mode video encoding process according to one embodiment. Initially, the encoding unit 350 receives 404 an input video frame form the video input buffer 110. The bitmap filtering unit 326 filters 406 the input video frame and determines 408 whether to perform bitmap-mode encoding. In response to the input frame to be encoded in bitmap-mode, the bitmap-mode video encoder 1100 encodes 410 the input frame in bitmap mode. In response to the input frame to be encoded in non-bitmap-mode, the encoding module 1120 encodes 420 the input frame in non-bitmap mode. The bitstream generator 1108 generates 430 the encoded bitstream and sends it to the decoding unit over the communications means 400.

Figure 5:
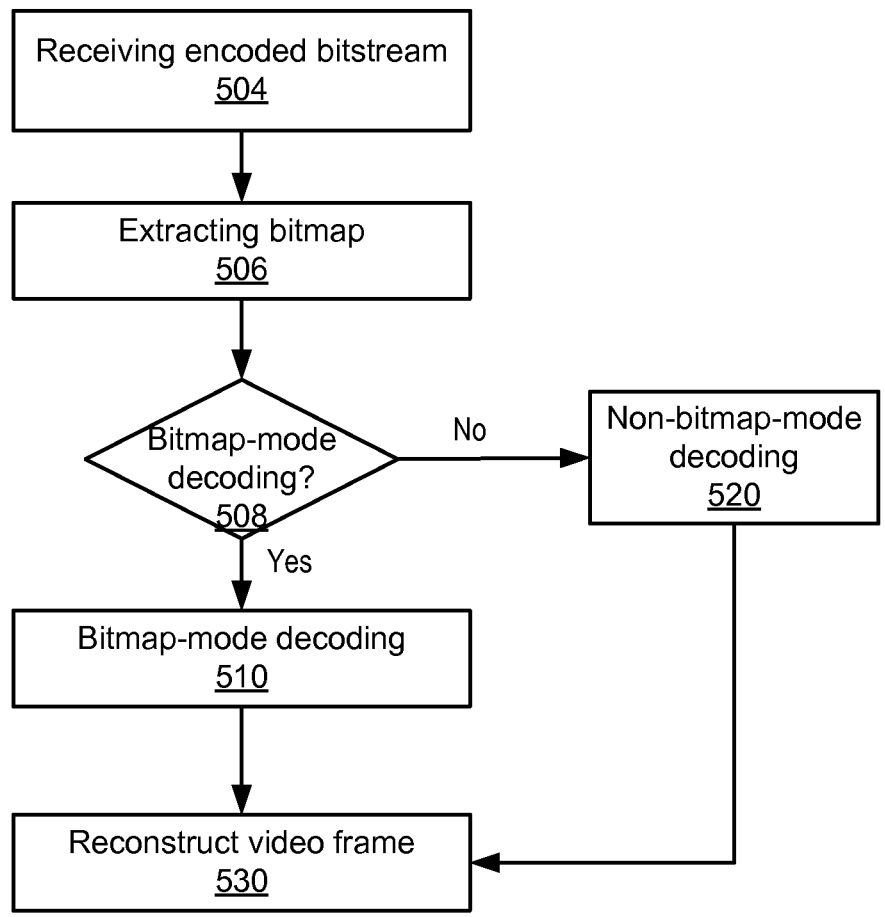
FIG. 5 is a flowchart illustrating a bitmap-mode video decoding process according to one embodiment.

FIG. 5 is a flowchart illustrating a bitmap-mode video decoding process according to one embodiment. Initially, the decoding unit 500 receives 504 an encoded bitstream frame from the encoded bitstream buffer 1202. The bitmap extractor 1204 extracts 506 the bitmap and the DCT-type data from the encoded bitstream and sends the bitmap and DCT-type data to the bitmap decoder 1206 and DCT decoder 1028, respectively. In response to the bitstream to be decoded in bitmap-mode, the bitmap-mode video decoder 1200 decodes 510 the bitstream in bitmap mode. The inverse bitmap filtering unit 1210 applies the corresponding inverse filter to the decoded bitstream. In response to the bitstream to be decoded in non-bitmap-mode, the decoding module 1220 or the DCT decoder 1208 decodes 520 the bitstream in non-bitmap mode. The reconstruction unit 1212 reconstructs 530 the input video frame.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A system for encoding data using bitmap-mode encoding, comprising:

an encoding unit having a data input, a data output and a control input, for encoding data for transmission, the input of the encoding unit coupled to receive input data, and the output of the encoding unit providing encoded data, the encoding unit generating a data stream comprising the input data encoded both lossless and lossy in response to a signal at the control input; and a bitmap filtering unit configured to detect sharp edges in a frame of input data and generate a signal to control encoding of the video frame in a bitmap encoding mode responsive to the detection of sharp edges in the frame of input data and a signal to control encoding of the video frame in a non-bitmap encoding mode responsive to not detecting sharp edges in the frame of input data, the bitmap filtering unit configured to generate a bitmap of a frame of input data and generate DCT-type data of the frame by manipulating a plurality of pixels of the frame after extracting the bitmap from the frame, the bitmap data encoded lossless and the DCT-type data encoded lossy by the encoding unit responsive to the signal to control encoding of the video frame in the bitmap encoding mode, the bitmap filtering unit coupled to the control input of the encoding unit for providing the signal to control encoding.

2. The system of claim 1, further comprising a storing unit, configured to store a plurality of video frames, the storing unit coupled to provide a video frame of the plurality of the video frames to the bitmap filtering unit for determining an encoding mode.

3. The system of claim 1, wherein the bitmap filtering unit is configured to determine an encoding mode of the video frame by filtering the video frame.

4. The system of claim 1, wherein the bitmap filtering unit is configured to generate a bitmap of a frame by extracting a most significant bit of a plurality of pixels of the frame.

5. The system of claim 1, wherein the bitmap filtering unit is further configured to generate a bitmap of a frame by replacing the value of a pixel by a selected integer value, the pixel being from the plurality of pixels of the frame.

6. The system of claim 1, wherein the encoding unit comprises:

a bitmap encoder configured to encode bitmap data of the video frame losslessly;

a DCT encoder configured to encode DCT-type data of the video frame; and a bitstream generator configured to generate an encoded bitstream comprising both encoded bitmap data and encoded DCT-type data of the video frame.

7. The system of claim 6, wherein the bitmap encoder is configured to encode the bitmap data using run-length encoding.

8. The system of claim 6, wherein the DCT encoder is configured to encode the DCT-type data using lossy encoding on a selected portion of the DCT-type data of the frame.

9. A method for encoding data using bitmap-mode encoding comprising:

storing a video frame for encoding;

filtering the video frame to detect sharp edges in the video frame;

responsive to not detecting sharp edges in the video frame, encoding the video frame in a non-bitmap encoding mode; and responsive to detecting sharp edges in the video frame, encoding the video frame in a bitmap encoding mode by:

generating a bitmap of the video frame and generating DCT-type data of the frame by manipulating a plurality of pixels of the frame after extracting the bitmap from the frame, the bitmap data encoded lossless and the DCT-type data encoded lossy; and generating a data stream comprising the video frame encoded both lossless and lossy.

10. The method of claim 9, wherein generating a bitmap of a video frame comprises extracting a most significant bit of a plurality of pixels of the video frame.

11. The method of claim 9, wherein generating a bitmap of a video frame further comprises replacing the value of a pixel by a selected integer value, the pixel being from a plurality of pixels of the video frame.

12. The method of claim 9, wherein encoding the video frame further comprises:
encoding bitmap data of the video frame losslessly;
encoding DCT-type data of the video frame; and
generating an encoded bitstream using the encoded bitmap data and encoded DCT-type data.

13. The method of claim 12, wherein encoding the bitmap data further comprises run-length encoding the bitmap data.

14. The method of claim 12, wherein encoding the DCT-type data comprises using lossy encoding on a selected portion of the DCT-type data of the video frame.

15. A system for decoding a data stream using bitmap-mode decoding, the system comprising:
a bitmap extractor configured to extract both bitmap data and DCT-type data from the data stream, the data stream created by selecting an encoding mode for a video frame based on detection of sharp edges in the video frame, the video frame encoded in a bitmap encoding mode responsive to detection of sharp edges in the frame and encoded in a non-bitmap encoding mode responsive to no detection of sharp edges in the frame, the video frame encoded in the bitmap encoding mode by generating a bitmap of the video frame and generating DCT-type data of the video frame by manipulating a plurality of pixels of the video frame after extracting the bitmap from the video frame, the bitmap data encoded lossless and the DCT-type data encoded lossy, the data stream generated to include both the bitmap data encoded lossless and the DCT-type data encoded lossy when the video frame is encoded in the bitmap encoding mode, the bitmap extractor coupled to receive the data stream;
a decoding unit configured to decode the extracted bitmap data and DCT-type data, the decoding unit coupled to the bitmap extractor; and
an inverse bitmap filtering unit configured to combine the decoded bitmap data and DCT-type data to generate a decoded data, the inverse bitmap filtering unit coupled to the decoding unit.

16. The system of claim 15, further comprises a reconstruction unit for reconstructing a video frame from the decoded data.

17. The system of claim 15, wherein the decoding unit comprises:
a bitmap decoder configured to decode the bitmap data; and
a DCT decoder configured to decode the DCT-type data.

18. The system of claim 17, wherein the bitmap decoder is configured to use run-length decoding on the bitmap data to restore the bitmap data of the video stream.

19. A method for decoding a data stream using bitmap-mode decoding, the system comprising:
receiving a data stream for decoding, the data stream created by selecting an encoding mode for a video frame based on detection of sharp edges in the video frame, the video frame encoded in a bitmap encoding mode responsive to detection of sharp edges in the frame and encoded in a non-bitmap encoding mode responsive to no detection of sharp edges in the frame, the video frame encoded in the bitmap encoding mode by generating a bitmap of the video frame and generating DCT-type data of the video frame by manipulating a plurality of pixels of the video frame after extracting the bitmap from the video frame, the bitmap data encoded lossless and the DCT-type data encoded lossy, the data stream generated to include both the bitmap data encoded lossless and the DCT-type data encoded lossy when the video frame is encoded in the bitmap encoding mode; and
responsive to the data stream including both the bitmap data encoded lossless and the DCT-type data encoded lossy:
extracting both bitmap data and DCT-type data from the data stream;
decoding the extracted bitmap data and DCT-type data; and
generating decoded data by combining bitmap data and DCT-type data.

20. The method of claim 19, further comprising reconstructing a video frame from the decoded data.

21. The method of claim 19, wherein decoding the extracted bitmap data comprises:
decoding the bitmap data using run-length decoding on the bitmap data.

* * * * *